United States Patent Office 3,309,784
Patented Mar. 21, 1967

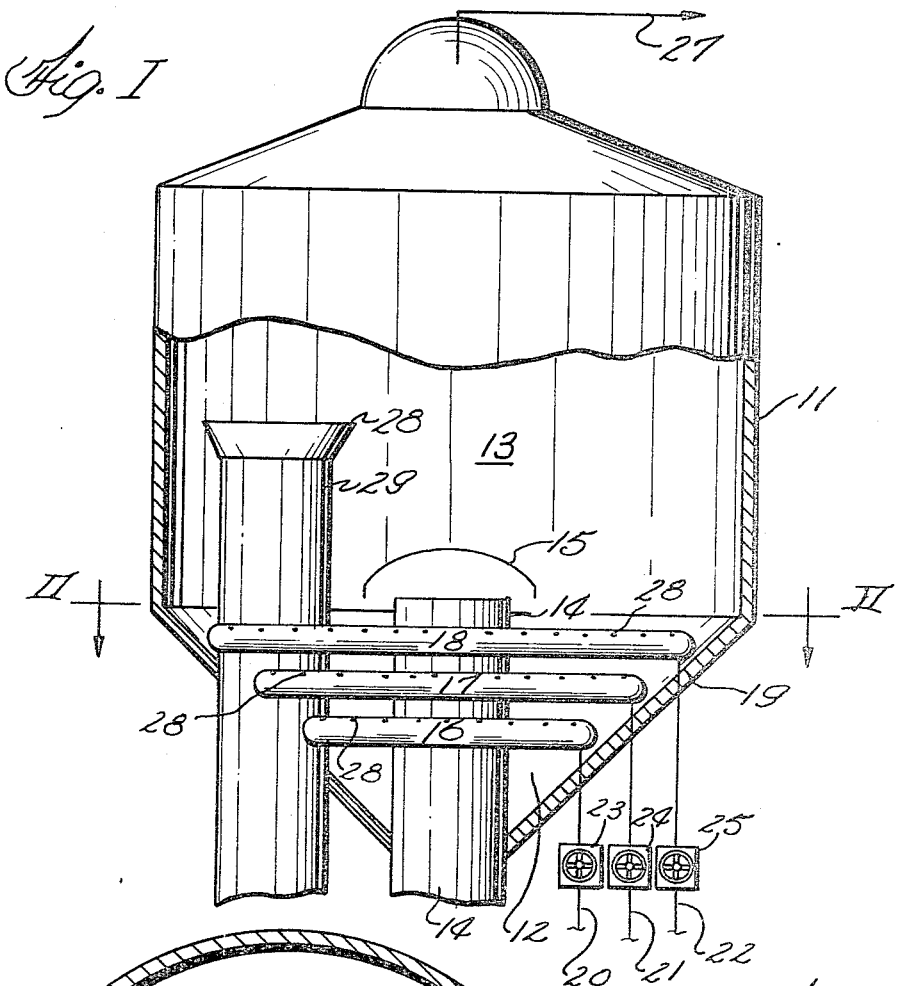
Fig. I
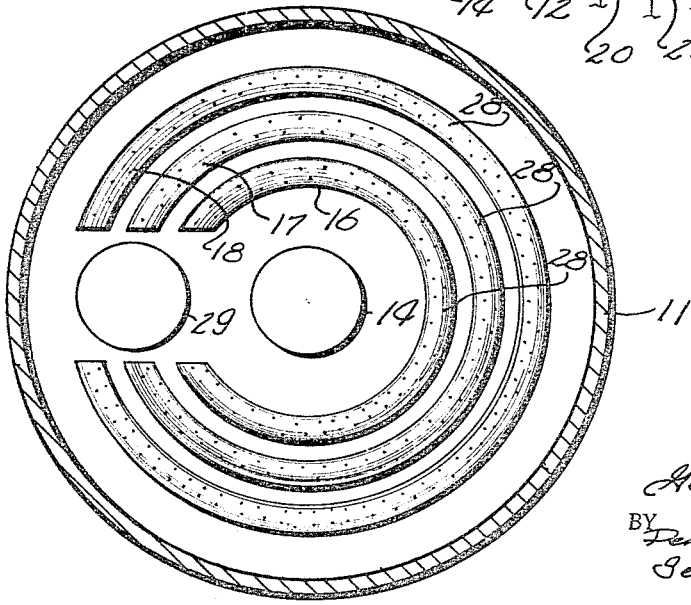
Fig. II

3,309,784
APPARATUS FOR CONTACTING FLUIDIZABLE SOLIDS WITH GASIFORM FLUIDS
George F. Adams, 2111 E. 26th St., Tulsa, Okla. 74114
Filed Mar. 16, 1964, Ser. No. 352,186
3 Claims. (Cl. 34—57)

This invention relates to an improved apparatus for contacting fluidized solids with gasiform fluids. More particularly, the invention relates to an improved means for distributing a gasiform fluid throughout a fluidized solids bed within a reaction vessel.

In one of its aspects, the invention relates to and provides a vessel of improved design adapted for the regeneration of catalysts or contact masses in the fluidized state. The new design regenerator vessel is provided with means for distributing air or other combustion-supporting gas through a bed of spent catalyst for the purpose of regeneration thereof. With this new design it is possible to control and regulate distribution of the combustion-supporting gas throughout various annular zones within the unit. While the design of the present reaction vessel is highly advantageous for use as a spent catalyst regeneration vessel, it is not limited thereto but has general application for contacting fluidized solids with gasiform fluids. Thus, for example, a vessel constructed in accordance with the invention is eminently suitable for use in fluid coking processes wherein a heavy petroleum oil is pyrolyzed to relatively lighter hydrocarbons and coke by contact with fluidized, finely divided, heat carrying solids at a relatively high temperature such as about 900–1800° F. In such fluidized solids operations it is most essential that the fluidizing gas, which also may be a reactant, be properly distributed throughout the fluid bed. The present invention provides gas distributing means whereby the amount and rate of flow of air in various annular zones of the vessel can be positively and accurately controlled.

A reactor unit having a construction and design in accordance with the present invention will be described in relation to its use as a regenerator vessel for spent catalysts such as spent cracking catalysts, spent hydroforming catalysts and the like. Reference will also be had to the accompanying drawing in which:

FIGURE I is an elevation in section of one suitable form of apparatus constructed in accordance with the present invention; and FIG. II is a plan view of the apparatus of FIG. I taken on the line II—II.

Referring to the drawing, the apparatus comprises a cylindrical vessel or outer shell 11 having a conical bottom section 12. The spent catalyst which is in fluidized condition is admitted to bed 13 through catalyst inlet pipe 14 and is maintained in dense phase therein. A baffle cap 15 is positioned over or above the catalyst inlet pipe 14 to reduce the velocity of the incoming catalyst and distribute it laterally within the lower section 12 of the regenerator vessel.

The gas required for supporting combustion within the regenerator vessel is circulated through a plurality of annularly and vertically spaced gas distributing rings, three of which, 16, 17 and 18, are shown in the drawing for the purpose of illustration. Each of the gas distributing rings 16, 17 and 18 are provided with a plurality of apertures 28 along the upper surfaces thereof through which a combustion-supporting gas passes into intimate contact with the spent catalyst. These gas distributing rings are disposed adjacent the bottom conical section of the regenerator unit and are rigidly supported by the conical lower wall 19 of the unit. In addition to the apparent advantages of providing a simple, rugged construction, positioning of the gas distribution rings adjacent the lower wall of the unit results in more efficient utilization of the regenerator unit, there being substantially no unused or dead space between the walls of the unit and the gas distributing rings. The annular or lateral spacing of the rings affords positive control over the distribution of the combustion-supporting gas in the various annular zones of the unit. To this end, each of the gas distributing rings, 16, 17 and 18, communicates with air inlet lines 20, 21 and 22, with the gas flow through the latter being individually and variably regulated by valves 23, 24 and 25 respectively. Thus, depending upon such factors as the capacity of operation and the particular distribution of spent catalyst throughout the catalyst bed, the amount and rate of the flow of the combustion-supporting gas in the various annular zones of the vessel can be regulated as desired. For example, during low capacity operation, the air flow through the innermost gas distributing ring 16 can be increased relative to the outer rings 17 and 18 in order to achieve greater combustion in the area where the concentration of the spent catalyst is greatest.

The gasses resulting from combustion (flue gases) emerge from the catalyst bed and are removed overhead from the regenerator vessel by line 27. The regenerated catalyst, after having undergone burning in the unit, builds up until in operation a level is obtained whereby the catalyst overflows the upper end 28 of outlet pipe 29 through which it is withdrawn and recycled for further use.

The solids treating vessel of this invention differs radically from prior art apparatus commonly used for regeneration of spent catalysts and similar solids treating operations. Such prior art units generally employ a large perforated grid plate for supporting the catalyst bed. Introduction of the catalyst into the unit requires that the catalyst pass through the perforations in the grid plate which results in erosion of the grid plate with consequent frequent replacement and expensive maintenance. Not only are the large perforated grid plates expensive to install and maintain, but they are disadvantageous also because of the "dead space" existing between such plate and the bottom wall of the regenerator vessel. In contrast to these prior art catalyst regenerator vessels, the solids treating vessel of the present invention is distinguished (1) by its simplicity of construction, (2) the low maintenance requirements thereof, (3) the solids to be treated do not pass through small holes in a perforated grid plate, (4) the gas distributing means are mounted adjacent and rigidly supported by the lower wall of the regenerator unit, (5) distribution of the combustion-supporting gas throughout the annular ones within the vessel is under positive control and (6) substantially the entire capacity of the regenerator vessel is available for burning of the spent catalyst.

It should be understood that any desired number of gas distributing annular rings can be employed in the solids treating vessel depending upon the conditions and purpose of operation. Likewise, in lieu of a conical bottom section as shown, the vessel can have a hemispherical, elliptical or other suitable end closure.

Those modifications and equivalents which fall within the spirit of the invention and the scope of the appended claims are to be considered part of the invention.

I claim:

1. Apparatus for contacting fluidizable solids and gas which comprises a generally cylindrical vessel having outlet means in the upper portion thereof for removing gases, an inlet conduit for said fluidizable solids extending through the lower wall of the vessel and into the lower section thereof, a downwardly turned baffle cap in vertical spaced relationship and encompassing the interior end of said fluidizable solids inlet conduit, an outlet conduit for said fluidizable solids extending through said bottom wall of said vessel and a substantial distance into the interior thereof, gas distributing means within said vessel comprising a plurality of annularly and vertically spaced conduit rings circumferentially arranged with respect to said fluidizable solids inlet conduit, the upper side of each of said rings having apertures therein permitting gas flow therethrough, gas inlet means communicating with each of said rings for admitting gas thereto and means for variably regulating the flow of gas to each of said rings.

2. Apparatus for contacting fluidizable solids and gas which comprises
 a vertically disposed vessel;
 outlet means in the upper portion of said vessel for removing gases;
 means for laterally disposing said solids into said vessel to form a fluidized bed;
 means to remove said fluidizable solids from said vessel;
 means to distribute said gas substantially across the cross-section of said bed in substantially vertical annular zones in intimate contact with said fluidizable solids, said means to distribute said gas comprising:
  a plurality of annularly and vertically spaced conduit rings disposed adjacent to and supported by the lower walls of said vessel, the upper side of each of said rings having apertures therein permitting gas flow therethrough in said subtantially vertical annular zones,
 gas inlet means communicating with each of said rings for admitting gas thereto, and
 means to variably regulate the flow of gas to each of said spaced rings to vary said intimate contacting in each of said annular zones.

3. Apparatus for contacting fluidizable solids and gas which comprises:
 a generally cylindrical vessel;
 outlet means in the upper portion of said vessel for removing gases;
 means for laterally disposing said fluidizable solids into the lower part of said vessel to form a fluidized bed;
 means for removing said fluidizable solids from said vessel comprising a conduit extending through the lower part of said vessel a substantial distance into the interior thereof;
 means to distribute said gas substantially across the cross-section of said bed in substantially vertical annular zones in intimate contact with said fluidizable solid, said means to distribute said gas comprising:
  a plurality of annularly and vertically spaced conduit rings disposed adjacent to and supported by the lower walls of said vessel, the upper side of each of said rings having apertures therein permitting gas flow therethrough in said substantially vertical annular zones;
 gas inlet means communicating with each of said rings for admitting gas thereto; and
 means to variably regulate the flow of gas to each of said spaced rings to vary said intimate contacting in each of said annular zones.

References Cited by the Examiner

UNITED STATES PATENTS

| | | | |
|---|---|---|---|
| 2,761,769 | 9/1956 | Elder | 34—10 |
| 2,974,419 | 3/1961 | Hauk et al. | 34—10 |
| 3,093,450 | 6/1963 | Luerssen et al. | 34—57 |

FREDERICK L. MATTESON, JR., *Primary Examiner.*

WILLIAM F. O'DEA, *Examiner.*

J. J. CAMBY, *Assistant Examiner.*